US008828532B2

(12) United States Patent
Varshney et al.

(10) Patent No.: US 8,828,532 B2
(45) Date of Patent: Sep. 9, 2014

(54) POLYMER COMPOSITE FOR EXTRACTING CESIUM FROM NUCLEAR WASTE AND/OR OTHER INORGANIC WASTES/SOLUTIONS (75) Inventors: Lalit Varshney, Mumbai (IN); Amar Kumar, Mumbai (IN)

(73) Assignee: The Secretary, Department of Atomic Energy, Govt. of India; Anushakti Bhavan, Chatrapati Shivaji Maharaj Marg, Mumbai (IN)

( * ) Notice: Subject to any disclaimer, the term of this patent is extended or adjusted under 35 U.S.C. 154(b) by 263 days.

(21) Appl. No.: 13/382,905

(22) PCT Filed: Jul. 9, 2009

(86) PCT No.: PCT/IN2009/000393
§ 371 (c)(1),
(2), (4) Date: Feb. 23, 2012

(87) PCT Pub. No.: WO2011/004382
PCT Pub. Date: Jan. 13, 2011

(65) Prior Publication Data
US 2012/0144957 A1   Jun. 14, 2012

(51) Int. Cl.
*B32B 5/32* (2006.01)
*C22B 60/00* (2006.01)
*C09K 3/00* (2006.01)
*B01J 20/28* (2006.01)
*B01J 39/02* (2006.01)
*B01J 47/00* (2006.01)
*G21F 9/12* (2006.01)

(52) U.S. Cl.
CPC .......... *B01J 47/007* (2013.01); *B01J 20/28004* (2013.01); *B01J 20/28023* (2013.01); *B01J 20/28033* (2013.01); *B01J 39/02* (2013.01); *B01J 20/28011* (2013.01); *B01J 20/28069* (2013.01); *B01J 20/28014* (2013.01); *B01J 20/28085* (2013.01); *G21F 9/12* (2013.01)
USPC .................. 428/316.6; 428/317.9; 428/315.5; 428/315.7; 252/184; 75/393

(58) Field of Classification Search
CPC ...................... B01J 20/28004; B01J 20/28014; B01J 20/28033; B01J 39/02; B01J 47/007; G21F 9/12
USPC .................. 252/184; 428/315.5, 315.7, 316.6, 428/317.9; 75/393
See application file for complete search history.

(56) References Cited

U.S. PATENT DOCUMENTS 4,714,482 A  12/1987  Polak
5,279,745 A   1/1994  Jeffers

FOREIGN PATENT DOCUMENTS

EP         1695760        8/2006
WO     WO 02/35581        5/2002

OTHER PUBLICATIONS

Jan. 13, 2011, ISR for PCT/IN2009/000393.

(Continued)

*Primary Examiner* — Hai Vo
(74) *Attorney, Agent, or Firm* — Neifeld IP Law, PC (57) ABSTRACT A polymer composite with superior granulometric properties for the extraction of active and non-active cesium from high level acidic radioactive nuclear waste and/or other inorganic wastes/solutions that is particularly useful to nuclear industry. The void volumes of the said polymer composite is varied to obtain the desired Cs ion exchange kinetics wherein the composite material is radiation resistant and stable in highly acidic and alkaline medium.

12 Claims, 5 Drawing Sheets

(56) References Cited

OTHER PUBLICATIONS

Nov. 30, 2008, Banerjee D et al: "Recovery of purified radiocesium from acidic solution using ammonium molybdophosphate and resorcinol formaldehyde polycondensate resin" Desalination, Elsevier, Amsterdam, NL, vol. 232, No. 1-3, Nov. 30, 2008, pp. 172-180.

Mar. 6, 2002, T.J. Tranter: "Evaluation of ammonium molybdophosphate-polyacrylonitrile (AMP-PAN) as a cesium selective sorbent for the removal of 137Cs from acidic nuclear waste solutions" Advances in Environmental Research, vol. 6, Mar. 2002, pp. 107-121.

Feb. 1, 1995, Ferdinand Sebesta: "An overview of the Development, Testing, and Application of Composite absorbers" Report No. LA-12875-MS, Los Alamos National Lab Feb. 1, 1995, pp. 1-30.

Dec. 4, 2002, T.J. Tranter: "Determination of a solid Phase Mass Transfer Coefficient for Modeling an Adsorption Bed System Using Ammonium Molybdophosphate-Polyacrylonitrile (AMP-PAN) as a sorbent for the Removal of 137 Cs from Acid ic nuclear Waste solutions" Adsorption, vol. 8, No. 4, Dec. 2002, pp. 291-299.

Jan. 1, 1990, Sebesta F et al: "Composite Ion Exchanger With Ammonium Molybdophosphate and Its Properties" Journal of Radioanalytical and Nuclear Chemistry, Articles, Elsevier Sequoia S.A., Lausanne, CH, vol. 140, No. 1, Jan. 1, 1990, pp. 15-21.

POLYMER COMPOSITE FOR EXTRACTING CESIUM FROM NUCLEAR WASTE AND/OR OTHER INORGANIC WASTES/SOLUTIONS

CROSS REFERENCE TO RELATED APPLICATIONS

This application is a national stage entry of PCT/IN2009/000393, filed Jul. 9, 2009.

FIELD OF INVENTION

The present invention relates to a polymer composite for the extraction of cesium from high level acidic nuclear waste that is particularly useful to nuclear industry. Specifically, the invention is directed to a AMP blended polymer composite for the separation of active Cesium. More specifically, the polymer composite material of this invention with superior granulometric properties open up a possibility wherein the void volume of the composite material can be varied to obtain the desired Cs ion exchange capacity, is radiation resistant and stable in highly acidic and alkaline medium. Also, the composite material is helpful for the separation of non-active Cesium from other inorganic wastes/solution.

BACKGROUND ART

The operation of nuclear power plants, reprocessing plants research facilities and the use of radioisotopes in industry and diagnostic medicine produces a wide variety of radioactive wastes. Many of these wastes need to be treated in order to reduce the radioisotopes concentration to levels acceptable for discharge to the environment. One of the most conventional processes used for the treatment process is ion exchange.

Nuclear power reactors use fuel rods containing uranium. Cesium is a by product of nuclear fission process of $^{235}U$. The spent fuel contains cesium along with several other radioactive elements. These rods are dissolved in concentrated nitric acid and the solution thus obtained is processed for removal of radioactive elements.

It is thus highly desirable to remove cesium from this waste solution to make waste handling easy as well as for possible use of separated cesium as radiation source. These sources can be used for blood irradiation, food preservation, hygeinization of sewage sludge and for radiation sterilization of medical products.

To be useful as a Cesium on exchanger in acidic nuclear waste streams, an inorganic compound must exhibit a number of unique properties. The waste streams to be treated have very high levels of Na, K, Ca, Al, Fe, Zr and $H^+$ concentrations relative to Cs. The candidate ion exchange material must have high Cs capacity in presence of these other cations which are up to five orders of magnitude greater in concentration. The $HNO_3$ concentration in each of the waste streams is ~3-5 M which demands the exchange material to be stable to acidic and oxidizing environments. The compounds must also be highly resistant to radiolytic degradation and elevated temperatures resulting from decay heat generation. Finally the compound must be amenable to fixation by a suitable binding agent or support that will allow the formation of a bead or grain with good mechanical and hydraulic properties. The binding agent must also possess the same qualities of stability in high acid, oxidizing and radiation environments.

The use of inorganic ion-exchangers and related composites for treating liquid radioactive wastes has recently gained prospect due to greater safety and lower cost of such exchangers in addition to thermal and radiation stability and high selection for the capture of certain ions.

The ion exchange mechanism of AMP or ammonium phosphomolybdate that exists in microcrystalline powder form was first reported by Buchwald and Thistlewaite (1957) and according to Smit and Van (1958), the phosphomolybdate complex ion $[PMo_{12}O_{40}]^{3-}$ consists of a hollow sphere formed by 12 $MoO_6$ octahedra with the $PO_4$ group in the centre of the crystal structure of the ammonium salt of this ion. The ammonium ions with the associated water molecules are probably fitted in between these spheres of negative ions thus accounting for the cohesion of these ions. They also report that the exchange of $NH_4^+$ ions for the monovalent ions $Na^+$, $K^+$, $Rb^+$, $Cs^+$, with Cs being much preferred over the others. Thus AMP is a selective ion exchanger for cesium.

AMP is available in fine powder form and hence unsuitable for column operations. To make it suitable for intended practical application like the ones to be used in column operations in nuclear plants involved in handling nuclear wastes, it has to be converted into granular forms for use. To create a composite absorber out of AMP, it must be fixed with a binding agent, substrate or support that will allow it to be used in a packed bed column for the separation of Cesium from highly acidic nuclear wastes with reasonable flow rate and pressure. To improve on the granulometric property, AMP is often mixed with asbestos, paper, silica gel, alumina, macro porous organic resin, polyvinyl acetate or polystyrene etc. These modified AMP containing exchanger could not be used for technological application because of lower amount of active AMP loaded on these support and poor granulomertic property. Because of their disadvantage in possessing unsuitable granulometric and mechanical properties, many methods have been proposed for improving such properties of this inorganic ion-exchanger.

Various ammonium molybdophosphate $(NH_4)_3[(MoO_3)_{12}PO_4]$ or AMP bound polymers and polymer composites became well known in the art to separate cesium wherein the polymer and polymer composites comprise of poly methylmethacrylate (PMMA), polyacrylonitrile (PAN) and natural polymers like alginates that showed improvement in granulometric properties.

V, Stoy et. al, in Czech Patent A.O. 181605 achieved improvement in granulomertic properties of the powdered AMP inorganic exchanger in using organic hydrophilic or macro porous polymer and copolymer based on polyacrylonitrile (PAN).

H. Mimura et. al. in Journal of Nuclear Science and Technology, 38, 2001, pp 872-878, teaches the immobilizing ability of prominent biopolymer like aliginic acids and alginates in effective granulation or blending of fine crystals of AMP ion-exchanger that offer a number of advantages such as simplicity of preparation, loading of high content of the active component (AMP), high porosity, high mechanical strength and high acid resistance. However, there remains a technological limitation in recovery of loaded Cesium from this substrate because of its deformation in alkaline media wherein the exchange kinetics is also slow due to rigid polymer/AMP composite structures.

T. J. Tranter et. al, in Advances in Environmental Research 6, 2002, pp 107-121 illustrates polyacrylonitrile matrix immobilized AMP, an engineered form of cesium selective sorbent material but with high equilibrium contact time.

Nilchi et. al, in Applied Radiation and Isotopes, 65, 2007, pp 482-487, teaches the removal of Cs and Co ions from medium active nuclear waste solutions containing granular hexacyanoferrate-based ion exchanger and their PAN (polyacrylonitrile) based composites that were chemically and thermally stable and stable in strong acidic solutions such as ≤5M but the amount of Cs and Co adsorbed decreases with increase in nitric acid concentration. However, PAN (polyacrylonitrile) itself is not stable in required highly acidic and basic conditions (3-5 M $HNO_3$, 1M and above NaOH, 8M $HNO_3$ dissolves PAN). Under these conditions, PAN gets hydrolyzed to polyacrylate and swells thereby increasing bed volume and thus unsuitable for large scale column operations. Due to said swelling and hydrolysis, mechanical properties also reduce wherein said PAN binder is excellent for neutral to weakly acidic solutions.

U.S. Pat. No. 4,714,482 teaches on the formation of thin film polymer blend membranes made by blending organic polymers and inorganic chemicals for gas sensing applications wherein said thin film polymer blend membranes are composited on solid porous beads comprising of polysulfone to impart increased structural strength to the membrane. Moreover, the polymers employed in forming the said thin film polymer blend membranes do not use polysulfone as the polymer in the said blend.

WO 02/35581 discloses a PAN-AMP composite wherein said PAN (polyacrylonitrile) forming the composite is itself not stable in required highly acidic and basic conditions such as 3-5 M $HNO_3$, 1M and above NaOH, 8M $HNO_3$ that dissolves the said PAN wherein under the said conditions PAN gets hydrolyzed to polyacrylate and swells and thus increasing bed volume, and hence undesirable for large scale column operations.

It is thus apparent from the discussions hereinbefore that the granular forms of known polymer-AMP composites of the above mentioned prior arts have technological deficiencies and suffer from one or many of the following drawbacks:
  i. hard;
  ii. lower available surface area;
  ii. low accessibility;
  iv. Deformation or swelling in alkaline solutions (acrylates);
  v. Decreased adsorption from highly acidic nuclear wastes;
  vi. low radiation stability;
  vii. slow exchange kinetics (longer equilibrium time)
  viii. labor intensive manufacturing and
  ix. use of significant quantities of organic solvents, cross-linkers etc.

Therefore it is imperative to develop and provide for alternatives that would be cost effective in requiring small volume of organic solvent in its process of preparation, has high AMP to polymer loading, is stable to radiation, has fast exchange kinetics (short equilibrium time) and shows increased stability in acidic and alkaline medium with no significant deformation of the polymer structure.

OBJECTS OF THE INVENTION

It is thus the basic object of the present invention to provide for a selective blend of high AMP to polymer loaded engineered composite material directed to aid in the rapid extraction of active and non-active Cesium from high level acidic nuclear waste and/or from other inorganic wastes/solutions.

Another object of the present invention is to provide for a AMP blended polymer composite that would have faster kinetics (shorter equilibrium time) to result in improved and high Cesium ion exchange capacity.

Yet another object of the present invention is to provide for a AMP blended polymer composite with a flexible composite structure such that the void volume can be varied to attain the desired exchange kinetics.

Yet further object of the present invention is to provide for a AMP blended polymer composite that would be thermally stable, stable in highly acidic and alkaline medium and radiation resistant.

Still another object of the present invention is to provide for a AMP blended polymer composite that would possess improved granulometric properties in spite of high AMP loading on the polymer support.

Another object of the present invention is directed to provide for a AMP blended polymer composite with improved granulometric properties and sufficient mechanical strength that would be amenable for column operation.

Yet further object of the present invention is to provide for a AMP blended polymer composite with improved granulometric properties in the form of beads, fibers, films etc. that are economic, easy to make and involves lesser quantities of organic solvents in its process of manufacturing.

Yet another object of the present invention is to provide for a AMP blended polymer composite with desired exchange kinetics that would lead to the desired Cesium ion extraction characteristics from high level acidic and radioactive nuclear waste.

SUMMARY OF THE INVENTION

This according to the basic aspect of the present invention there is provided a polymer composite for extracting active and non-active Cesium from high level acidic radioactive nuclear waste and/or other inorganic wastes/solutions comprising a blended composite of at least one of polysulfone or its derivatives, or mixtures thereof and Ammonium molybdophosphate (AMP) in the blend ratio of 1:2 to 1:6 providing a composite of highly inner porous structure and an outer structured layer having surface pores which together provide a void volume of 15 to 70% and skeleton density 1.1 to 1.6 gm/cc adapted for equilibrium time of 30-100 minutes and a Cesium ion exchange capacity of 0.4-1.0 meg/gm.

It is the finding of the present invention that a blend of AMP with a selective polymer with high AMP to polymer loading provide for obtaining the desired engineered composite material involving desired void volume and density of the composite structure which can also be varied to obtain desired exchange kinetics thereby aiding rapid extraction of active and non-active Cesium from high level acidic nuclear waste and/or from other inorganic wastes/solutions.

In accordance with a preferred aspect of the invention there is provided a polymer composite comprising an outer structured layer varying of from 20 to 25 µm with surface pores in the range of 100-300 nm together providing a void volume of 45 to 50% and density of 1.2 g/cc adapted for equilibrium time of 35-40 minutes and a Cesium ion exchange capacity of 0.75-0.8 meq/gm.

Preferably, there is provided a polymer composite wherein the said polymer substrates comprise polysulfone and its derivatives, preferably polyether sulfone or its derivatives.

More preferably, a polymer composite is provided wherein the said derivatives of polysulfone comprise derivatives in the form of different substituents attached to the benzene ring of the unit.

Advantageously, a polymer composite is provided in the present invention wherein the various forms of the said composite comprises of film, bead or fiber preferably bead.

Importantly, a polymer composite is provided wherein the polymer substrate of molecular weight between 60,000 to 200,000 comprise Glass Transition Temperatures ($T_g$) between 170 to 250° C.

In another preferred aspect of the invention a polymer composite is provided wherein the molecular weight of 150,000 has of a Glass Transition Temperature ($T_g$) 210° C. and molecular weight of 60,000 has a Glass Transition Temperature ($T_g$) 180° C.

In yet another preferred aspect of the present invention there is provided a polymer composite comprising void volume of 20-22%, density 1.6 (g/cc), equilibrium time 90-100 minutes has a cesium ion exchange capacity of 0.7 meq/gm.

Significantly, a polymer composite is provided comprising improved granulometric properties which is thermally stable up to 200° C., radiation resistant and stable in highly acidic and alkaline medium without any significant change in ion exchange capacity of AMP.

Still another aspect of the present invention there is provided a process for the preparation of the above said polymer composite comprising of the following steps (a) reacting the polymer substrate comprising at least one of polysulfone or its derivatives, or mixtures thereof dissolved in a suitable solvent with AMP in required amount in the temperature range of 20 to 50° C. and (b) obtaining therefrom the said polymer composite.

Advantageously the above said polymer composite finds effective use for the extraction of active and non-active Cesium from high level acidic radioactive nuclear waste and/or other inorganic wastes/solutions.

The details of the invention, its objects and advantages are explained hereunder in greater detail in relation to non-limiting exemplary illustrations as per the following exemplary illustrations:

BRIEF DESCRIPTION OF THE FIGURES

The foregoing aspects and many of the attendant advantages of this invention will become more readily appreciated as the same becomes better understood by reference to the following detailed description, when taken in conjunction with the accompanying graphs, images and photographs wherein.

DETAILED DESCRIPTION OF THE INVENTION

Figure 3A:
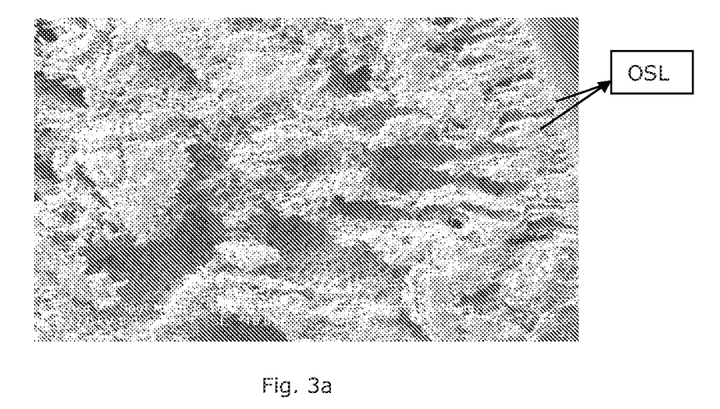
FIGS. 3a, 3b, 3c and 3d: The SEM images of the AMP-polymer composite and the magnification of its cross section (3a, 3b, 3c) and surface (3d) prepared in accordance with the embodiment of the present invention.
Figure 3B:
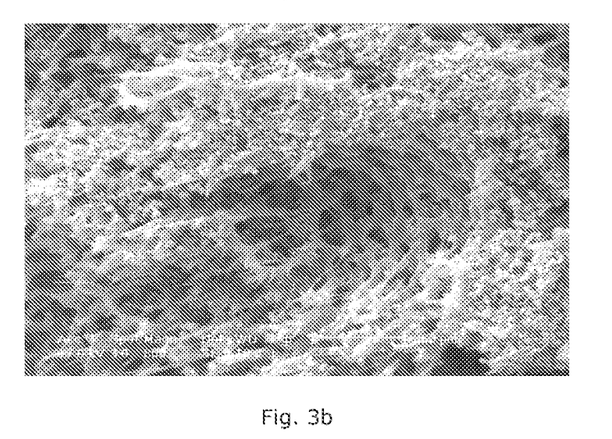
Figure 3C:
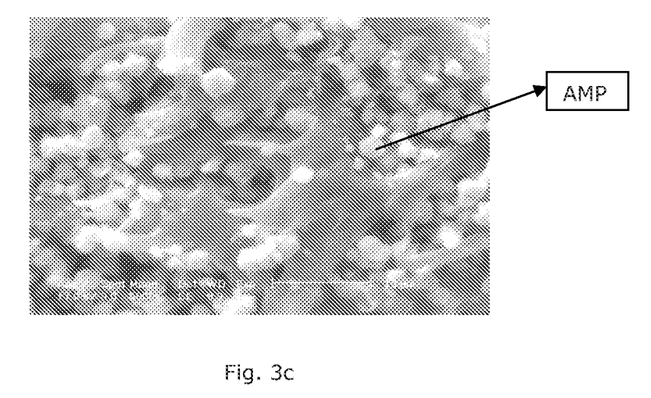
Figure 3D:
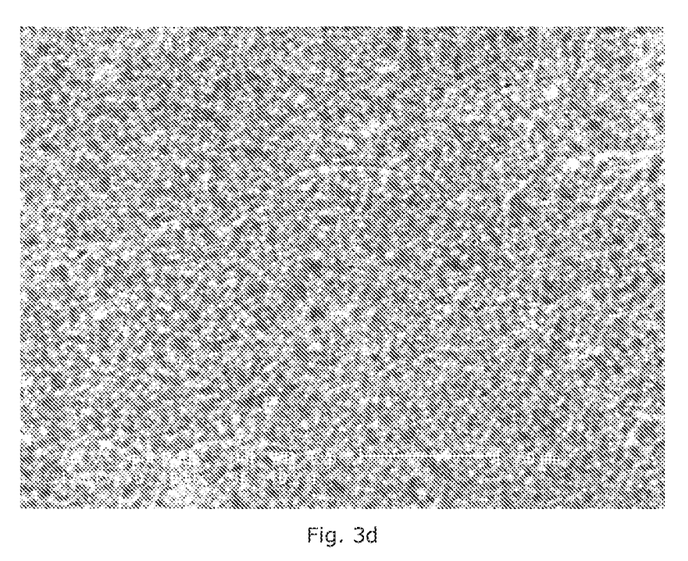

As discussed herein before, the present invention provides a polymer composite of polysulfone, polysulfone derivative, preferably polyether sulfone and its derivatives or their mixture with AMP having highly inner porous structure and an outer structured layer (FIG. 3a, marked as OSL) that control the exchange kinetics wherein the pore diameter varies from 100 to 300 nm (pore sizes are determined from SEM surface photograph, FIG. 3d wherein it is also revealed that the AMP density in the outer layer is much higher than AMP present inside the bead wherein the crystals of AMP are uniformly distributed through out the said surface layer). The polysulfone derivative in the embodiment of the present invention strictly means different substituents attached to the benzene ring of the unit. The various forms of the composite such as film, bead or fiber have higher kinetics of exchange of cesium, are stable to radiation, thermally stable and stable in acidic and alkaline medium. The bead form is the preferred form for column operation. About 90% percent of exchange capacity of AMP was achieved. Importantly, the void volume and density of the composite structure was varied to obtain the desired exchange kinetics. It was achieved in a simple way by selecting a suitable polymer which is radiation stable and inert to acidic or alkaline medium; dispersing the said polymer and AMP in a suitable and common organic solvent wherein the polymer is soluble in the solvent but AMP is finely dispersed (not soluble) and both polymer and AMP are insoluble in water; introducing this solution dropwise into water whereby beads are formed entrapping the AMP. The above said polymer forms a highly porous structure in the presence of AMP in the process of formation of such composite.

The polymer forms a highly porous structure in the presence of AMP and in the process of formation of the composite. In the above said polymer-AMP composite of the invention, the AMP granules are dispersed and encaged inside the porous beads wherein the beads have enough mechanical strength for normal column operations for extraction of cesium from high level acidic nuclear waste.

Interestingly, the new composite of the present invention obtained by using known ingredients efficiently extracts Cesium from high level acidic nuclear waste overcoming all the limitations known so far and as discussed in the Background Art Section. A typical polymer composite preferably comprising of AMP in the range of 60-90% and polymer in the range of 10-40% with void volume in the range of 15-70 percent and polymer density between 1.1-1.6, extracts Cesium with equilibrium time ranging from 30-100 min and Cesium ion exchange capacity of 0.4-1.0 m equivalent/gm.

The invention is illustrated further in greater detail in relation to the following non-limiting exemplary illustrations:

Example I

Typical Procedure for the Synthesis of the AMP Blended Polymer Composite

In a typical procedure, polymer substrate is dissolved in a suitable solvent including di-chloromethane, n-methyl pyrrolidone and N—N dimethylacetamide, N—N dimethyl formamide and/or their mixtures and ammonium molybdophosphate or AMP in required amount is added slowly at 35° C. and stirred for 30 minutes. The resulting solution is syringed out and added drop wise in distilled or de-ionized water. Different sized beads are obtained by wet phase separation process by varying the bore size of the needle. The beads are washed extensively with water. The wet beads are put in a stainless steel column. Simulated, acidic radioactive waste is passed through the column. Input and output counts are recorded using gamma detector.

Figure 1A:
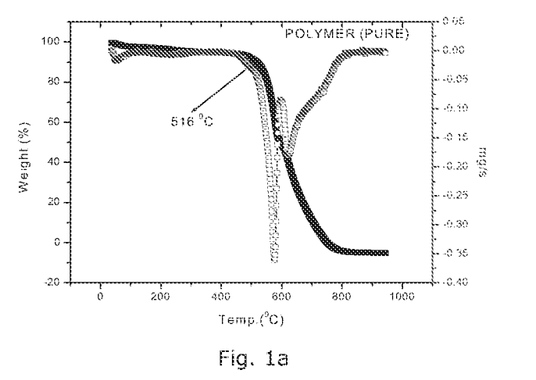
FIGS. 1a, 1b and 1c: TGA-DTC curves of the pure polymer (1a) and the AMP bound polymer composite bead (with water, 1b) revealing the thermal stability of pure polymer, void volume shown by loss of water at peak temp. of 100° C., one of the decomposition peak of AMP (450° C.) and DSC glass transition temperature (Tg) of polymer (1c) in the bead prepared in accordance with the embodiment of the present invention.
Figure 1B:
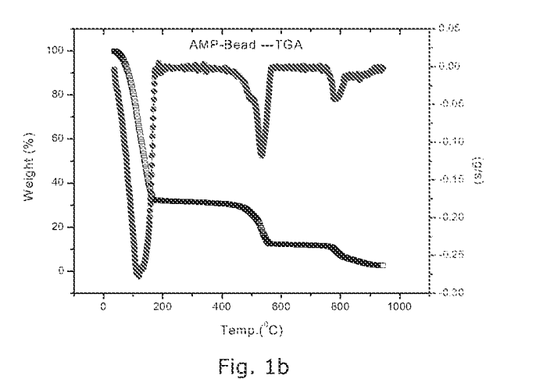

The thermal stability of the polymer and the resulting AMP-polymer composite bead is demonstrated by the TGA-DTA curves in FIGS. 1a and 1b.

Figure 1C:
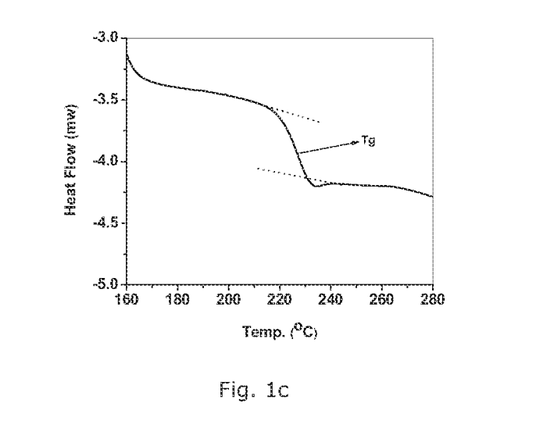

FIG. 1a reveal that there is a weight loss in the TGA/DTG curve at 516° C. indicating decomposition of pure polymer. The TGA/DTG curve of FIG. 1b reveals that the composite contains water. It reveals three prominent weight loss peaks, one at around 100° C. and the second at around 450° C. are particularly notable. First peak shows void volume in the bead which is equal to volume of the water lost (weight loss/density of water). FIG. 1c reveals a typical DSC glass transition temperature (Tg) of the polymer used in the present invention.

Figure 2A:
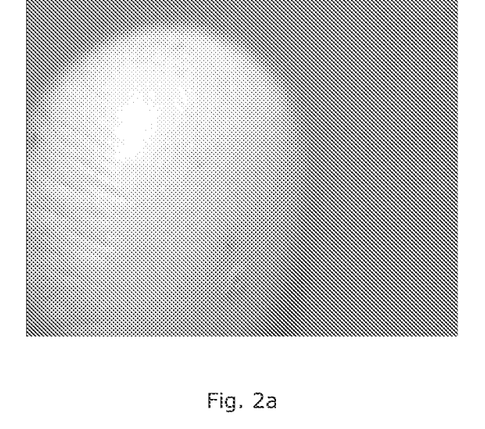
FIGS. 2a and 2b: The scanning electron microscopy photographs of the AMP-polymer composite beads and its cross section prepared in accordance with the embodiment of the present invention.
Figure 2B:
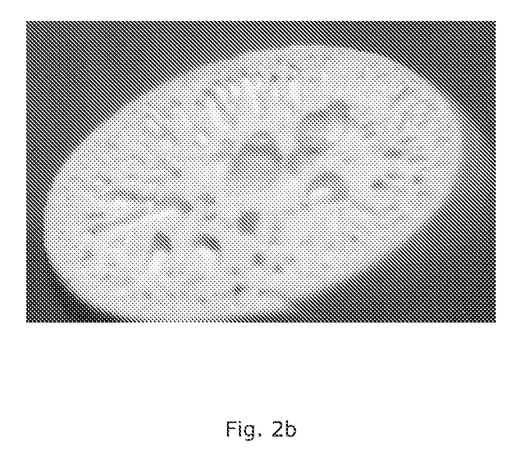

The optical microscopy photographs of the composite beads are demonstrated in FIG. 2a and its cross section revealed in FIG. 2b wherein the characteristic features of the composite beads include:

Particle Size: 300 μm-850 μm
sulk Density (Dry): 0.6 g/cc
sulk Density (wet, immersed in water)=1.2 g/cc
pH stability: Stable in acidic and alkaline medium
Radiation Stability: Excellent
Thermal stability: TGA/DTG profile of pure AMP gives decomposition steps at about 50-80° C. (due to moisture loss), 180° C., 450° C. and at 780° C. TGA/DTG profile of bead (FIG. 1b) shows steps at 100° C. (due to water loss), 450° C. and 780° C. Since the bead contains dispersed crystals of pure AMP, the thermal stability of functional bead is taken as about 180° C., whereas the polymer itself is stable up to 500° C.

The fine powders of AMP with high $Cs^+$ ion selectivity were granulated by using polymers of polysulfone and its derivatives and their mixtures used as immobilizing matrices. The SEM images of the AMP-polymer composite and the magnification of its surface are illustrated in FIGS. 3a, 3b, 3c and 3d respectively wherein FIG. 3a shows the magnification of its cross section and revealing 25 μm thick OSL containing AMP crystals, FIG. 3b shows that fine AMP crystals are immobilized in the polymer matrices. Further magnification as seen in FIG. 3c reflects that the AMP crystal size of about 1 to 3 μm is embedded in the polymer matrix and FIG. 3d shows uniform distribution of AMP crystal in OSL.

Example II

Synthesis of the AMP Blended Polymer Composite Comprising Different Weight Ratios of Polymer and AMP in Accordance with the Above Described Procedure a. 15 gm of polyether sulfone is dissolved in 85 gm of N-methyl pyrrolidone. 80 gm of AMP was dispersed in the solution and bead was made following the procedure illustrated in Example I.
b. 25 gm of polyether sulfone is dissolved in 75 gm of N-methyl pyrrolidone. 80 gm of AMP was dispersed in the solution and bead was made following the procedure illustrated in Example I.
c. 15 gm of polyether sulfone is dissolved in 85 gm of N-methyl pyrrolidone. 40 gm of AMP was dispersed in the solution and bead was made following the procedure illustrated in Example I.
d. 7.5 gm of polyether sulfone (Molecular weight 1, 50, 000) and 7.5 gm of polysulfone (Molecular weight 60, 000) is dissolved in 85 gm of N-methyl pyrrolidone. 20 gm of AMP was dispersed in the solution and bead was made following the procedure illustrated in Example I.

In order to assess the applicability and efficiency of the AMP-blended polymer composite in the form of beads for $Cs^+$ removal that is amenable to fixed bed column operation, the void volume of the beads packing the column was analyzed to elucidate the kinetic parameters such as equilibrium time and $Cs^+$ ion exchange capacity.

Void volume, equilibrium time and cesium ion exchange capacity of the resulting beads of the above described comparative processes (a-d) was measured and the values obtained is tabulated below in Table 1.

TABLE 1

| Sl. No. | Void Volume (%) | Equilibrium time (min) | Cesium ion exchange capacity (meq/gm) |
|---|---|---|---|
| a | 20-22 | 90-100 | 0.68 |
| b | 30-40 | 50-70 | 0.70 |
| c | 45-49 | 35-40 | 0.75-0.8 |
| d | 62 | 30-32 | 0.71 |

Values in Table 1 reveal that the void volume of the composite structure is flexible whereupon the void volume could be varied by varying the stoichiometry of the added ingredients. Also, it is reflected in the above table that a void volume of 45-49% gives the desirable equilibrium time to obtain maximum $Cs^+$ ion exchange capacity of 0.75-0.8 meq/gm.

The bound cesium on the AMP-polymer composite after acidic nuclear waste treatment (of acidity of 3-4 M $HNO_3$ solution) was further treated in alkaline medium preferably with 1M NaOH solution to download the Cs-bound AMP for further separation and reuse Cesium. The following observable features during the dissolution process as demonstrated in FIG. 4 are highlighted below pointwise:

Complete dissolution of Cs-bound AMP was achieved after passing 11 liters of 1 M NaOH.
There was no bed expansion during dissolution.
No reduction of AMP (blue colour formation) as seen in the other acrylates based materials.
No formation of white precipitate in the solution obtained after dissolution.
Dissolution process is fast and smooth.
Production process is easy and environment friendly as water is used as solvent for the product
Large scale manufacturing can be done from locally available ingredients.

Figure 4:
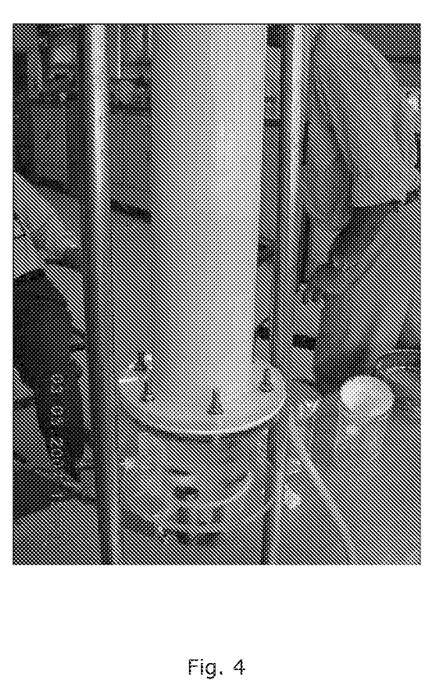
FIG. 4: Photograph demonstrating the experiment performed on the cesium bound AMP-polymer composite prepared in accordance with the embodiment of the present invention obtained after acidic nuclear waste treatment that is being further treated with NaOH solution to download the Cs-bound AMP for further separation and reuse of Cesium.

The above mentioned FIG. 4 also demonstrates that the white coloured portion in the column of the AMP-polymer composite bead is due to the absence of AMP from those regions of the composite beads structure because of the dissolution of AMP by NaOH whereas the yellow coloured portion as seen in the column is due to the undissolved fraction of the AMP in the AMP-polymer composite bead that is waiting to be dissolved as is normally seen in column operations. The collecting chamber below shows a yellow coloured solution which is the alkaline Cs-AMP solution as extracted by 1M NaOH.

Advantageously, the AMP blended polymer composite is technically advanced comprising up to 90% AMP loaded onto it which still remains suitable for column operations. The composite of the invention is thermally stable, stable in acidic and alkaline medium and has high radiation resistance. Additionally, the ion exchange utilization capacity of the bound AMP in the polymer composite of the present invention is 90-95%. Most importantly, the void volume of the AMP-polymer composite structure can be varied to obtain the desired exchange kinetics.

It is thus possible by way of the present invention to provide for an AMP blended polymer composite with high Cesium ion exchange capacity adapted for the extraction of Cesium from high level acidic nuclear waste. Also, the invention is directed towards the further downloading of the Cesium-AMP from the bound Cs-AMP blended polymer composite by treating the polymer-AMP-Cs composite with an alkali that finally yields the Cesium. The separated Cesium thus becomes useful in radiation processing application as well as makes nuclear waste handling easier.

We claim:

1. A polymer composite for extracting active and non-active Cesium from high level acidic radioactive nuclear waste and/or other inorganic wastes/solutions comprising 10-40% by weight of a polymer and 60-90% by weight of Ammonium molybdophosphate (AMP) based on the weight of the polymer composite,
wherein the polymer comprises polysulfone, derivatives of polysulfone, or a combination thereof,
wherein the polymer composite comprises an inner porous structure and an outer structured layer having surface pores,
wherein the polymer composite has a void volume of 15 to 70% and a skeleton density of 1.1 to 1.6 gm/cc adapted for equilibrium time of 30-100 minutes and a Cesium ion exchange capacity of 0.4-1.0 meq/gm.

2. A polymer composite as claimed in claim 1, wherein the outer structured layer has a thickness ranging from 20 to 25 μm with the surface pores in the range of 100-300 nm,
wherein the polymer composite has a void volume of 45 to 50% and a density of 1.2 gm/cc adapted for equilibrium time of 35-40 minutes and a Cesium ion exchange capacity of 0.75-0.8 meq/gm.

3. A polymer composite as claimed in claim 1, wherein the polymer comprises polyether sulfone or its derivatives.

4. A polymer composite as claimed in claim 1, wherein said derivatives of polysulfone comprise derivatives in the form of different substituents attached to the benzene ring of the unit.

5. A polymer composite as claimed in claim 1, comprising a polymer to AMP weight ratio between 1:2 to 1:6, and a void volume of 15 to 60%.

6. A polymer composite as claimed in claim 1, wherein said composite is in the form of a film, a bead or a fiber.

7. A polymer composite as claimed in claim 1, wherein said polymer comprises a molecular weight between 60,000 to 200,000 and a Glass Transition Temperature (Tg) between 170 to 250° C.

8. A polymer composite as claimed in claim 7, wherein the polymer comprises a first polymer and a second polymer wherein the first polymer comprises a molecular weight of 150,000 and a Glass Transition Temperature (Tg) of 210° C. and wherein the second polymer comprises a molecular weight of 60,000 and a Glass Transition Temperature (Tg) of 180° C.

9. A polymer composite as claimed in claim 1, comprising a void volume of 20-22%, a density of 1.6 gm/cc adapted for equilibrium time of 90-100 minutes and a cesium ion exchange capacity of 0.7 meq/gm.

10. A polymer composite as claimed in claim 1, comprising improved granulometric properties which is thermally stable up to 200° C., radiation resistant and stable in acidic and alkaline medium without any significant change in ion exchange capacity of AMP.

11. A process for the preparation of the polymer composite as claimed in claim 1 comprising of the following steps:
    (a) dissolving the polymer in a solvent to form a solution,
    (b) dispersing the AMP in the solution at a temperature ranging of from 20 to 50° C., and
    (c) obtaining therefrom the said polymer composite.

12. A method of using the polymer composite as claimed in claim 1 for the extraction of active and non-active Cesium from high level acidic radioactive nuclear waste and/or other inorganic wastes/solutions by following the steps of:
    a) providing said polymer composite
    b) bringing said polymer composite in contact with high level acidic radioactive nuclear waste and/or other inorganic wastes/solutions for $Cs^+$ ion removal/extraction from said wastes/solutions and obtaining a cesium bound composite therefrom;
    c) treating the cesium bound composite in alkaline medium to download the Cs-bound AMP for further separation and reuse of Cesium.

* * * * *